United States Patent
Burg et al.

(10) Patent No.: US 7,793,816 B2
(45) Date of Patent: Sep. 14, 2010

(54) FRICTION STIR WELDING APPARATUS

(75) Inventors: James T. Burg, Verona, PA (US); Israel Stol, Pittsburgh, PA (US); Donald J. Spinella, Greensburg, PA (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 13 days.

(21) Appl. No.: 11/852,072

(22) Filed: Sep. 7, 2007

(65) Prior Publication Data

US 2009/0065553 A1    Mar. 12, 2009

(51) Int. Cl.
B23K 20/12    (2006.01)
B23K 37/04    (2006.01)

(52) U.S. Cl. ..................... 228/2.1; 228/112.1

(58) Field of Classification Search ............. 228/2.1, 228/25–26, 44.3, 112.1
See application file for complete search history.

(56) References Cited

U.S. PATENT DOCUMENTS

| | | | |
|---|---|---|---|
| 2,227,627 A | 1/1941 | Bruzon |
| 2,351,996 A | 6/1944 | Morgan |
| 2,857,793 A | 10/1958 | Lucien |
| 3,264,446 A | 8/1966 | Gronlund |
| 3,487,530 A | 1/1970 | Ely |
| 3,555,239 A | 1/1971 | Kerth |
| 3,604,612 A | 9/1971 | Miller et al. |
| 3,643,969 A | 2/1972 | Finley et al. |
| 3,684,855 A | 8/1972 | Wepfer et al. |
| 3,702,914 A | 11/1972 | Noura |
| 3,718,798 A | 2/1973 | Randolph et al. |
| 3,789,181 A | 1/1974 | Netterstedt et al. |
| 3,873,798 A | 3/1975 | Friedman et al. |
| 3,942,337 A | 3/1976 | Leonard et al. |
| 4,122,990 A | 10/1978 | Tasaki et al. |
| 4,260,869 A | 4/1981 | Slavens et al. |

(Continued)

FOREIGN PATENT DOCUMENTS

DE    102005030800    1/2007

(Continued)

OTHER PUBLICATIONS

Definition of "monolithic", http://www.thefreedictionary.com/monolithic.*

(Continued)

*Primary Examiner*—Jessica L Ward
*Assistant Examiner*—Kevin E Yoon
(74) *Attorney, Agent, or Firm*—Greenberg Traurig, LLP

(57) ABSTRACT

Portable friction stir welding apparatus having a crawler which supports a motor for rotating a Friction Stir Welding tool and is coupled to a drive mechanism for urging the crawler along a predefined weld path on work pieces. The crawler can comprise one member or a set of two or three physically separated members each rotatably coupled to the friction stir welding tool. The friction stir welding tool for making the weld is rotatably coupled to each member and restricts axial displacement of the physically separate members relative to each other. The members are adapted to engage rails on the work pieces which provide at least one of guiding, alignment, fixturing, torque compensation for the members as the friction stir welding tool is rotated and the crawler is moved along a joint.

22 Claims, 7 Drawing Sheets

U.S. PATENT DOCUMENTS

| | | | |
|---|---|---|---|
| 4,272,973 A | 6/1981 | Fu-Tsai | |
| 4,356,574 A | 11/1982 | Johnson | |
| 4,483,106 A | 11/1984 | Wachs et al. | |
| 4,517,865 A | 5/1985 | Huang | |
| 4,659,903 A | 4/1987 | Berne et al. | |
| 4,767,048 A | 8/1988 | Kimbrough et al. | |
| 4,809,572 A | 3/1989 | Sasaki | |
| 4,835,829 A | 6/1989 | Welschof et al. | |
| 5,460,317 A * | 10/1995 | Thomas et al. | 228/112.1 |
| 5,697,544 A * | 12/1997 | Wykes | 228/2.1 |
| 5,725,698 A | 3/1998 | Mahoney | |
| 5,796,068 A | 8/1998 | Jones | |
| 5,971,252 A | 10/1999 | Rosen et al. | |
| 5,975,406 A | 11/1999 | Mahoney et al. | |
| 6,029,879 A | 2/2000 | Cocks | |
| 6,053,391 A | 4/2000 | Heideman et al. | |
| 6,132,435 A | 10/2000 | Young | |
| 6,227,430 B1 | 5/2001 | Rosen et al. | |
| 6,237,829 B1 * | 5/2001 | Aota et al. | 228/2.1 |
| 6,237,835 B1 | 5/2001 | Litwinski et al. | |
| 6,257,479 B1 | 7/2001 | Litwinski et al. | |
| 6,273,323 B1 | 8/2001 | Ezumi et al. | |
| 6,325,273 B1 | 12/2001 | Boon et al. | |
| 6,367,524 B1 | 4/2002 | Brewer | |
| 6,419,142 B1 * | 7/2002 | Larsson | 228/2.1 |
| 6,487,943 B1 | 12/2002 | Jansson et al. | |
| 6,497,355 B1 | 12/2002 | Ding et al. | |
| 6,510,975 B2 | 1/2003 | Enomoto | |
| 6,516,992 B1 | 2/2003 | Colligan | |
| 6,638,641 B2 | 10/2003 | Delano | |
| 6,648,206 B2 | 11/2003 | Nelson et al. | |
| 6,669,075 B2 | 12/2003 | Colligan | |
| 6,676,004 B1 | 1/2004 | Trapp et al. | |
| 6,685,081 B2 * | 2/2004 | Iwata | 228/112.1 |
| 6,706,130 B1 | 3/2004 | Minamitani et al. | |
| 6,712,007 B2 | 3/2004 | Yamamoto et al. | |
| 6,758,382 B1 | 7/2004 | Carter | |
| 6,779,704 B2 | 8/2004 | Nelson et al. | |
| 6,779,709 B2 | 8/2004 | Stotler et al. | |
| 6,799,708 B2 | 10/2004 | Von Strombeck et al. | |
| 6,834,889 B2 | 12/2004 | Sunde et al. | |
| 6,880,743 B1 | 4/2005 | Coletta et al. | |
| 6,908,690 B2 | 6/2005 | Waldron et al. | |
| 6,936,332 B2 | 8/2005 | Aota et al. | |
| 6,974,107 B2 | 12/2005 | Christensen et al. | |
| 6,994,242 B2 | 2/2006 | Fuller et al. | |
| 7,025,151 B2 | 4/2006 | Hehli et al. | |
| 7,198,189 B2 * | 4/2007 | Stol et al. | 228/2.1 |
| 7,275,675 B1 | 10/2007 | Carter et al. | |
| 7,281,647 B2 | 10/2007 | Stol et al. | |
| 7,383,975 B2 | 6/2008 | Stol et al. | |
| 7,401,723 B2 | 7/2008 | Stol et al. | |
| 7,464,852 B2 | 12/2008 | Waldron et al. | |
| 2001/0015369 A1 | 8/2001 | Litwinski et al. | |
| 2001/0025714 A1 | 10/2001 | Lieser | |
| 2003/0029903 A1 | 2/2003 | Kashiki et al. | |
| 2003/0217452 A1 | 11/2003 | Talwar et al. | |
| 2004/0035914 A1 | 2/2004 | Hempstead | |
| 2004/0191019 A1 | 9/2004 | Lee et al. | |
| 2004/0265065 A1 | 12/2004 | Stecher et al. | |
| 2005/0139640 A1 | 6/2005 | Kay | |
| 2005/0252947 A1 | 11/2005 | Fujii et al. | |
| 2005/0263569 A1 | 12/2005 | Miller | |
| 2006/0006211 A1 | 1/2006 | Loitz et al. | |
| 2006/0049232 A1 | 3/2006 | Murakami | |
| 2006/0065694 A1 * | 3/2006 | Stol et al. | 228/2.1 |
| 2006/0157531 A1 | 7/2006 | Packer et al. | |
| 2006/0254788 A1 | 11/2006 | Bucher | |
| 2006/0289604 A1 * | 12/2006 | Zettler et al. | 228/2.1 |
| 2007/0000972 A1 | 1/2007 | Koga et al. | |
| 2007/0034671 A1 | 2/2007 | Burton et al. | |
| 2008/0217377 A1 | 9/2008 | Stol et al. | |
| 2009/0230173 A1 | 9/2009 | Stol et al. | |

FOREIGN PATENT DOCUMENTS

| | | |
|---|---|---|
| FR | 2256807 | 8/1975 |
| JP | 11320128 | 11/1999 |
| JP | 11347753 | 12/1999 |
| JP | 2000176657 | 6/2000 |
| JP | 2000202647 | 7/2000 |
| JP | 2001129674 | 5/2001 |
| JP | 2002160077 | 6/2002 |
| JP | 2002263863 | 9/2002 |
| JP | 2003154469 | 5/2003 |
| JP | 2003236680 | 8/2003 |
| JP | 2003260574 | 9/2003 |
| WO | 0005025 | 2/2000 |
| WO | 0174526 | 10/2001 |
| WO | 0185385 | 11/2001 |
| WO | 2006009778 | 1/2006 |
| WO | 2006081819 | 8/2006 |
| WO | 2006037051 | 10/2006 |
| WO | 2008109649 | 9/2008 |
| WO | 2009033157 | 3/2009 |
| WO | 2009114861 | 9/2009 |

OTHER PUBLICATIONS

Office Action relating to U.S. Appl. No. 11/100,878 dated Oct. 16, 2007.

Office Action relating to U.S. Appl. No. 11/133,083 dated Oct. 31, 2007.

Office Action relating to U.S. Appl. No. 11/235,584 dated Jun. 13, 2006.

Office Action relating to U.S. Appl. No. 11/235,584 dated Nov. 21, 2006.

Office Action relating to Canadian Application No. 2,580,966 dated Nov. 12, 2008.

Supplementary European Search Report relating to European Application No. EP05800139 dated Apr. 11, 2008.

International Search Report and Written Opinion of International Searching Authority relating to International Application No. PCT/US05/34848 dated Aug. 15, 2006.

International Search Report and Written Opinion of the International Searching Authority relating to international Application No. PCT/US08/055869 dated Sep. 30, 2008.

International Search Report and Written Opinion of International Searching Authority relating to international Application No. PCT/US08/075599 dated Apr. 15, 2009.

Sclater et al., "Mechanisms & Mechanical Devices Sourcebook" Third Edition, Chapter 9, Coupling, Clutching, and Braking Devices, pp. 302-304, McGraw-Hill Copyright 2001, 1996, 1991.

Machine Components Corporation, Friction Hinges, Miniature Constant Torque, FH-8 Series Pamphlet http://www.machinecomp.com/fh_mini.htm, downloaded Apr. 30, 2007.

Machine Components Corporation, Electro-Magnetic Clutches (Spring Wrapped) Uni-Directional CEM Series Pamphlet http://www.machinecomp.com/emc_cem.htm, downloaded Apr. 30, 2007.

Machine Components Corporation, Slip Couplings, Constant Torque, C Series Pamphlet http://www.machinecomp.com/sc_cs.htm, downloaded Apr. 30, 2007.

Machine Components Corporation Solenoid Operated Clutch Brakes, Spring Wrapped Type, Non Reversing, CNR Series Pamphlet http://www.machinecomp.com/cnr13.htm, downloaded Apr. 30, 2007.

Definition of "bearing", Merriam-Webster Online Dictionary. Retrieved Aug. 13, 2009, from http://www.merriam-webster.com/dictionary/beating.

International Patent Application PCT/US05/21313, International Search Report (mailed Sep. 15, 2005).

International Patent Application PCT/US05/21313, Written Opinion (mailed Sep. 15, 2005).

International Patent Application PCT/US09/037300, International Search Report and Written Opinion (mailed Sep. 2, 2009).

International Patent Application PCT/US09/037300, partial International Search Report and and Written Opinion (mailed Jul. 7, 2009).

Office Action relating to U.S. Appl. No. 11/868,262, dated Apr. 30, 2009.

Office Action relating to U.S. Appl. No. 11/868,262, dated Aug. 28, 2009.

Office Action relating to U.S. Appl. No. 11/868,262, dated Jan. 8, 2010.

Office Action relating to U.S. Appl. No. 11/868,262, dated Mar. 26, 2010.

* cited by examiner

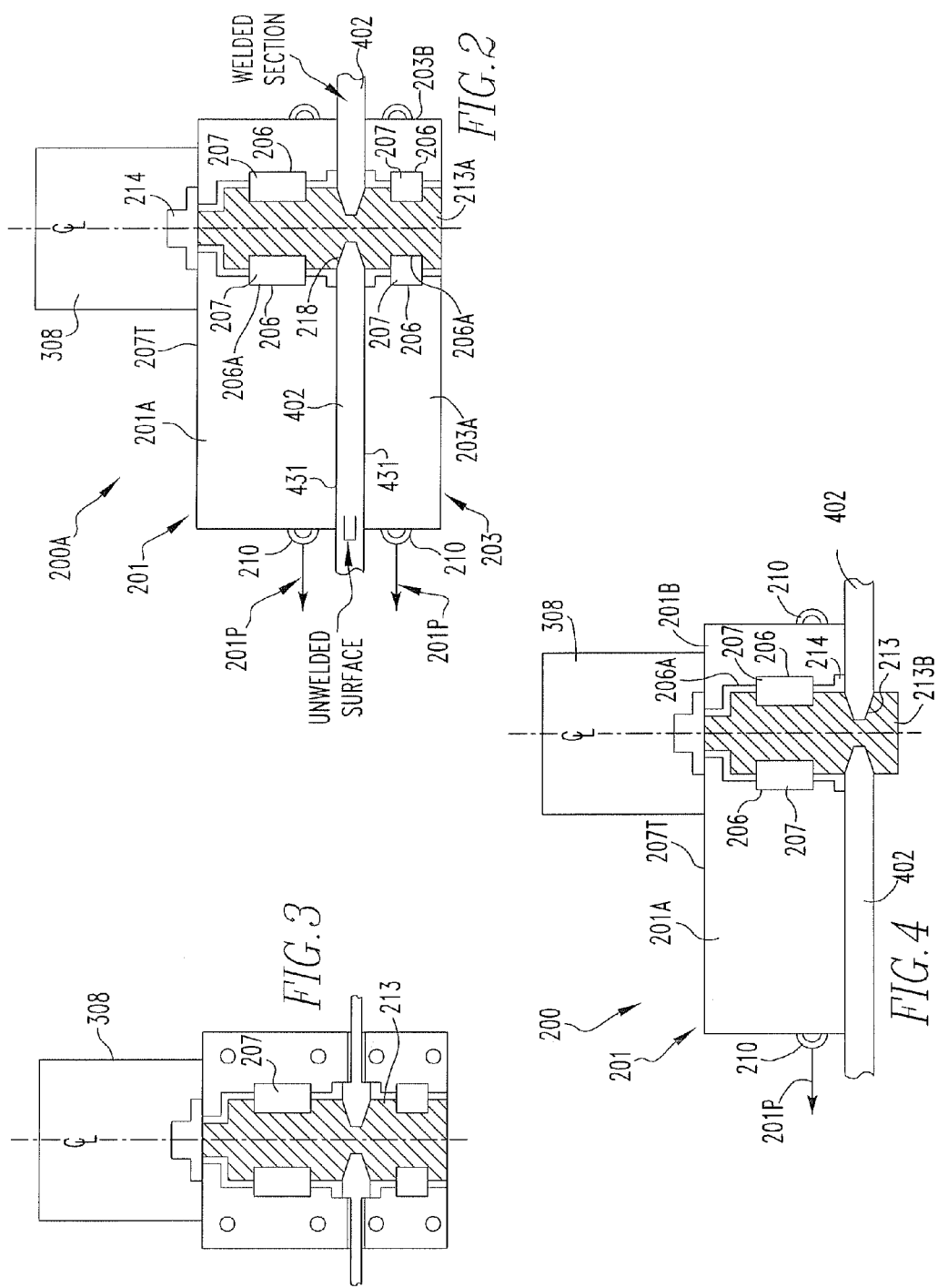

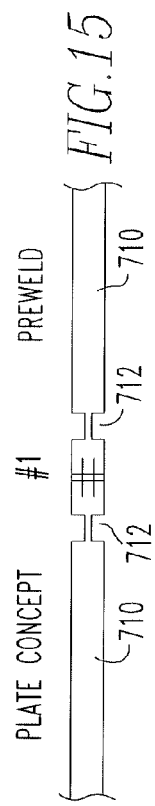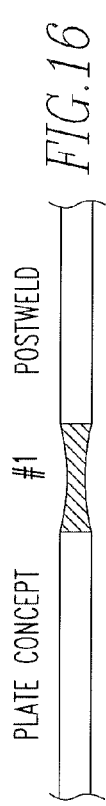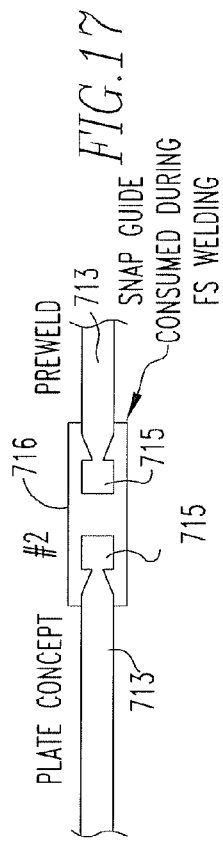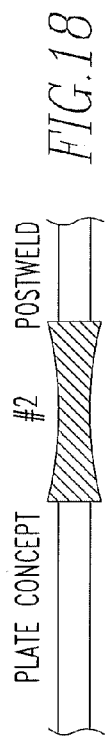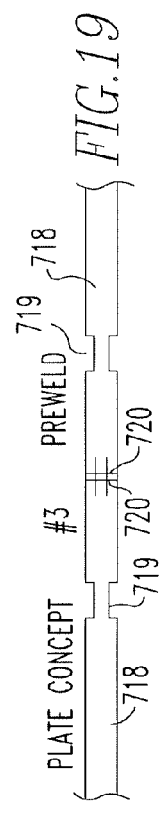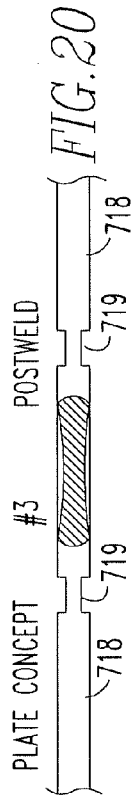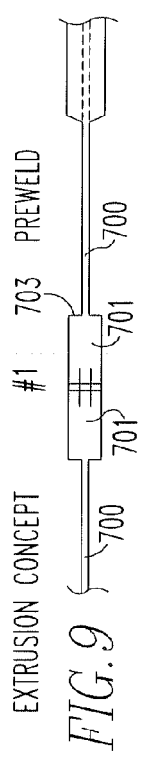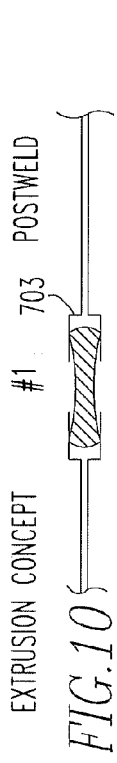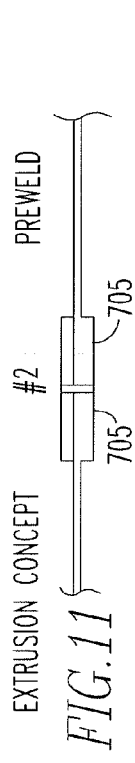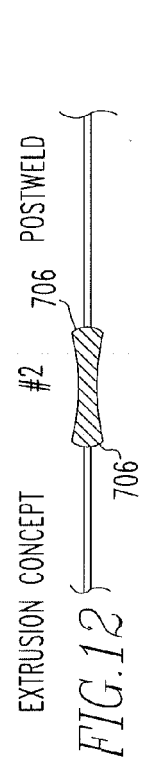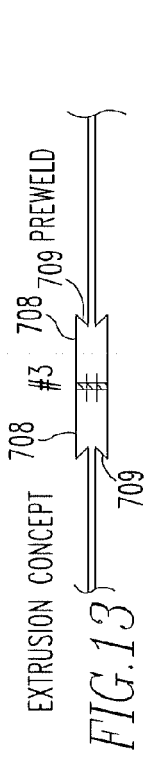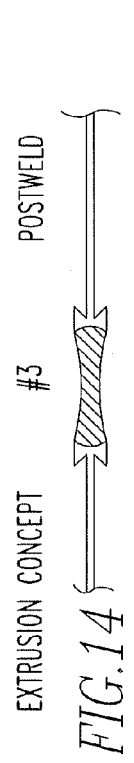

FRICTION STIR WELDING APPARATUS

FIELD OF THE INVENTION

One embodiment of the present invention is directed generally toward friction stir welding and surface processing and, more particularly, toward portable apparatus for use in friction stir welding and surface processing processes.

BACKGROUND OF THE INVENTION

Friction Stir Welding machines currently in use are normally designed for stationary installation in a building where the housing for holding the tool and the motor for spinning the tool are located. The type of weld joint being made such as butt, lap, etc., and the number of welds being made such as single double, etc., is determined by the tool being used.

SUMMARY OF THE INVENTION

The portable friction stir welding machine disclosed herein can be configured as a crawler having a top member which supports a motor, such as a torque motor, having a rotary shaft for rotating a Friction Stir Welding tool and a drive mechanism for pulling the crawler along a predefined weld path of work pieces. The crawler can include at least two physically separated members where one member is adapted to be located above the work pieces and the other member is adapted to be located below the work pieces. The friction stir welding tool for effecting the weld is rotatably coupled to each member of the crawler and effectively restricts axial displacement of, for example, the two physically separate members relative to each other. Thus, it is the friction stir welding tool which is rotatably coupled to each of the two members of the crawler and prevents the at least two members from being displaced axially relative to each other.

Rotational displacement of the at least two members relative to each other and/or relative to the work pieces can be provided by rails or guides located on one or both of the work pieces. Depending on the method used to prevent rotational displacement of the crawler relative to the work pieces, the type of rotating tool that is being used, and whether the weld being made starts and ends at the edges of the work pieces or in from the edges of the work pieces, one or more of the following functions may be required while making a weld: the speed that the crawler advances along the work piece, the rotational speed of the tool, steering the crawler, etc.

One embodiment of the present invention is a structure which is both easy to transport and can be moved to a work site rather than moving the work pieces to a building where a stationary Friction Stir Welding machine is located.

The foregoing has outlined, rather broadly, an embodiment of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar parts have similar reference numerals where:

FIG. 2 is a side sectional view of another embodiment of a friction stir welding assemblage having a housing with two separate members, where each member has two sections, coupled to a common tool;

FIG. 3 is a front sectional view of the embodiment of FIG. 2;

FIG. 4 is a side sectional view of still another embodiment of a friction stir welding assemblage having a housing with one member having two sections coupled to a tool;

FIGS. 9-20 show various work piece configurations and types of welds which can be made with the apparatus here disclosed.

DETAILED DESCRIPTION

Friction Stir Welding (FSW) is a process which can be used to weld together a wide variety of materials and their alloys such as aluminum, copper, iron, steel, stainless steel, etc. The weld is formed by plunging a rotating, non-consumable pin type tool into work pieces that are to be welded together with a butt or lap weld. During the welding process, as the pin type tool initially plunges into the work pieces at the weld line, the material is frictionally heated and plasticized at a temperature below that of the melting temperature and typically within the material's forging temperature range. When the metal becomes sufficiently soft and plastic, and the tool reaches the appropriate penetration depth, the tool is advanced along a weld line. As the tool is moved along the work pieces, metal flows to the back of the pin type tool where it is mixed behind the tool and consolidates while it cools to create a sound metallurgical bond. Friction stir welding, in addition to being used to join together similar metals, can also be used to join dissimilar metals or plastics or other materials that will soften and consolidate under frictional heating to become integrally connected. Friction stir welding can be used to make butt joints, corner joints, lap joints and other types of joints, as well as being used to repair cracks in a given material and for forming a hollow section, such as a round, square or rectangular tube.

The friction stir welding process is implemented with a FSW pin type tool which can have a single pin and a shoulder which contacts a top surface of the material being joined. An anvil which contacts the bottom surface of the work pieces opposite the FSW pin type tool can be used to prevent plasticized material from flowing out of the bottom of the weld during the welding process to provide a smooth weld surface. In some applications, the pin type tool may not include the anvil.

Figure 1:
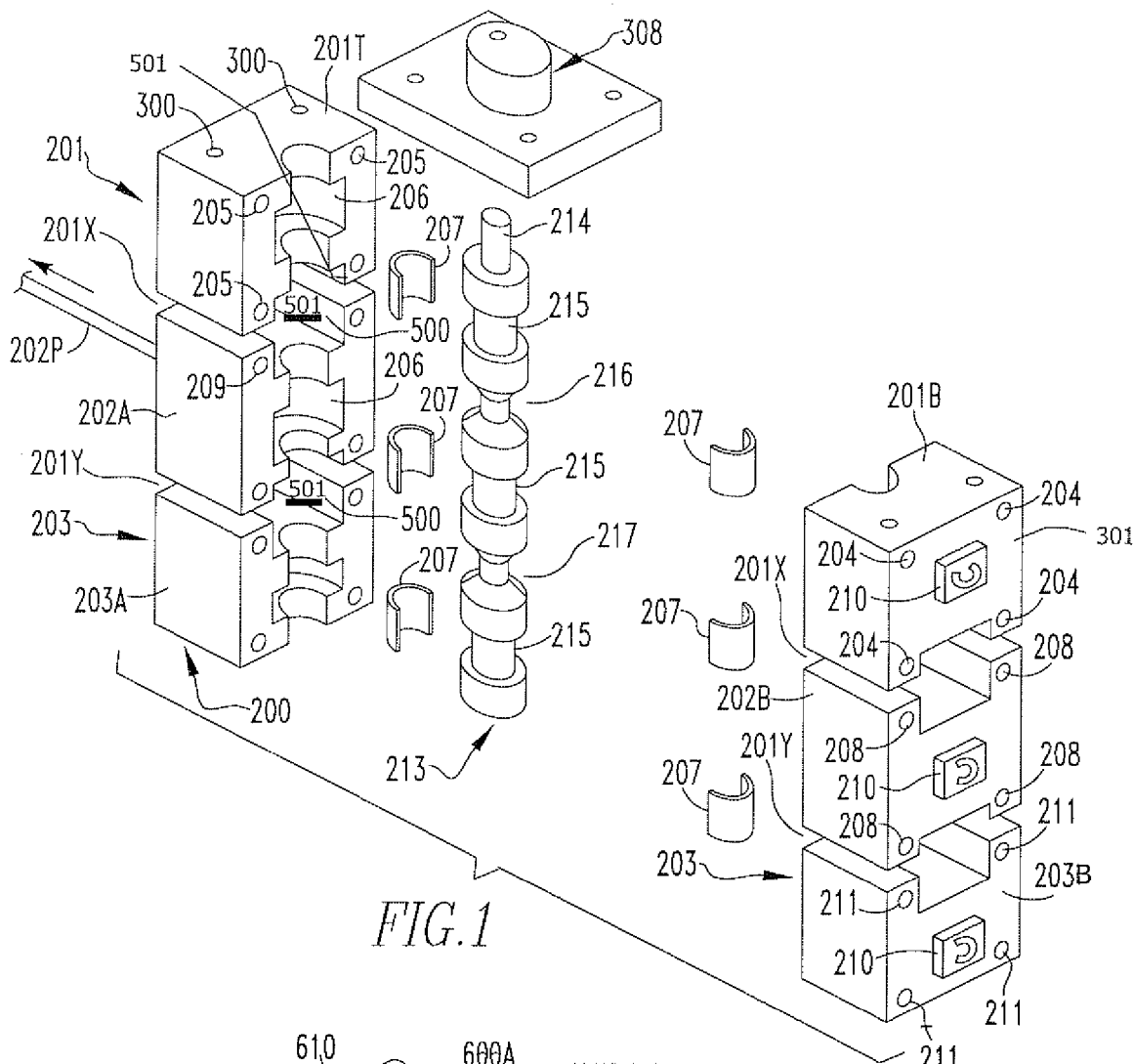
FIG. 1 is a perspective view of one embodiment of a friction stir welding assemblage of the present invention having a housing with three separate members, where each member has two sections, coupled to a common tool.

Referring to FIG. 1, there is shown a perspective view of one embodiment of the present invention having a housing of three separate members where each member is composed of two half sections coupled to a friction stir welding tool for making friction stir type of welds. Notwithstanding the illustrations in FIGS. 1-5 and the disclosure of the embodiment that describes in detail three separate members, it is within the scope and contemplation of this invention that the number of members, along with associated cooperating features, can be as many or as few as necessary to weld two or more work pieces together per design or customer requirements. Therefore, nothing disclosed herein is intended to limit the claimed invention.

In the present invention, the housing, hereinafter referred to as crawler 200, when making a weld, engages rail members at or near the edges of the work pieces (discussed in detail below). The rail members can be raised member or channels which slidably engage a receiving member, such as a slot or a side wall, in the crawler to provide guiding and torque compensation for the crawler during the welding process. The crawler can include, for example, upper member 201, intermediate member 202, and lower member 203. These members can be composed of a semi-yieldable material such as a plastic, or a rigid material such as cast iron or other equivalent material where each of the three members of the crawler is split to provide a front section and a back section. Upper member 201 of the crawler consists of two substantially similar sections, front section 201A and back section 201B. Back section 201B can have, for example, four clearance openings 204 for receiving threaded fasteners (not shown) that pass through clearance openings 204 and thread into threaded openings 205 in front section 201A to lock or secure the two sections 201A, 201B together to form member 201. Each section has a semi circular shaped cut out 206 for receiving a split sleeve bearing 207 or a race and ball bearings. Each member also includes cut out sections 500 having side walls 501 for receiving raised rails or channels (see FIGS. 9-20) which may be formed by extrusion on the work pieces such as, for example, aluminum sheet work pieces, where the rails are adapted to slidably engage the members to provide guiding, alignment and torque compensation for the members during the making of a weld. In those instances where the rails 701, see FIG. 9, in the work pieces are channels 712, see FIG. 15, then the crawler may have wheels (not shown) or rigid projections (not shown) which fit within the channels 712 to provide guiding and torque compensation for the crawler while a weld is being made. Clamping of the crawler to the work pieces can be provided by rails or channels which are sized to have a close fit with the engaging parts in the members or with spring members located in the crawler and both above and below the work pieces being joined.

Figure 1A:
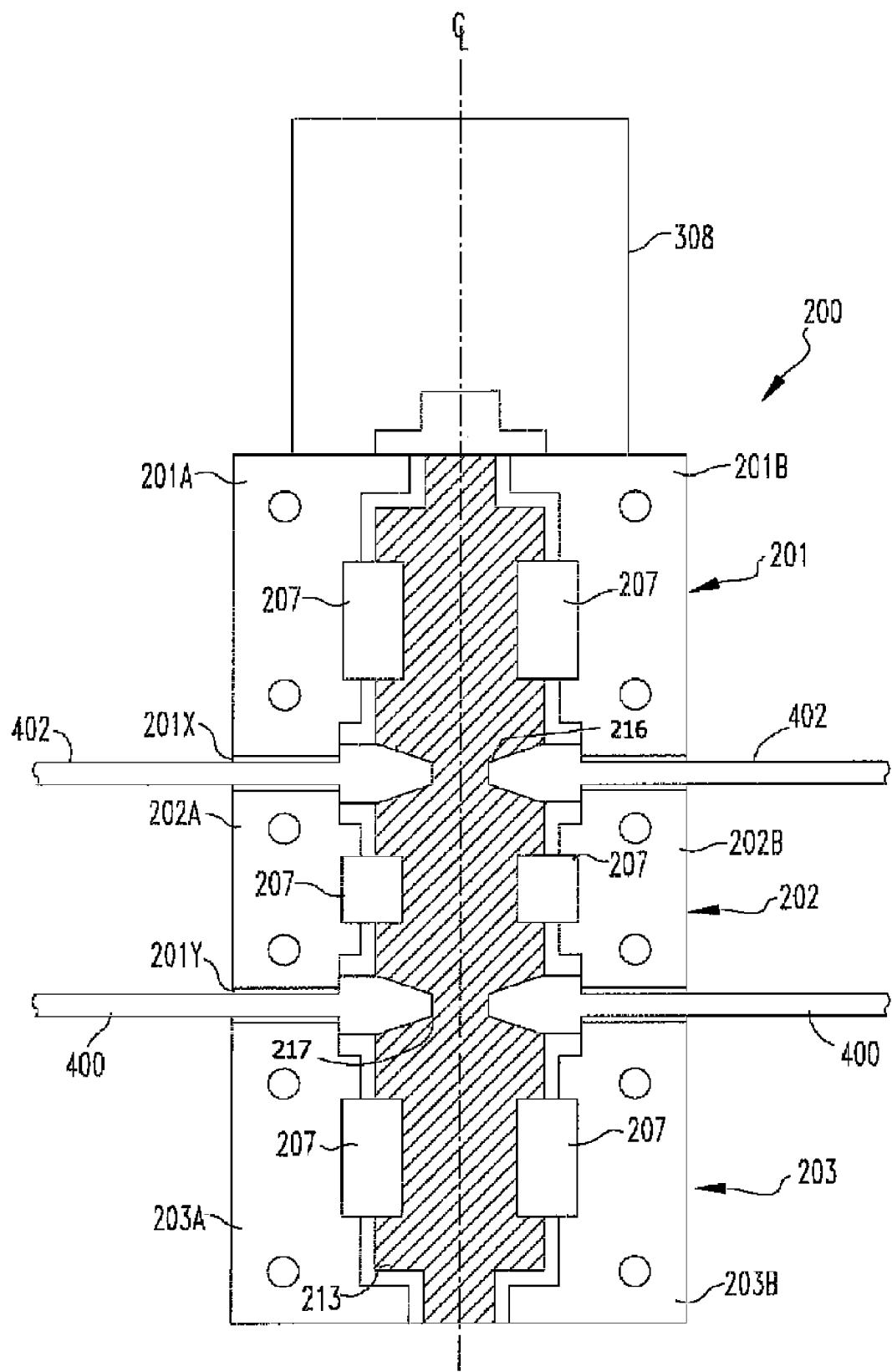
FIG. 1A is a side sectional view of the embodiment of FIG. 1 showing two work pieces being welded.
Figure 1B:
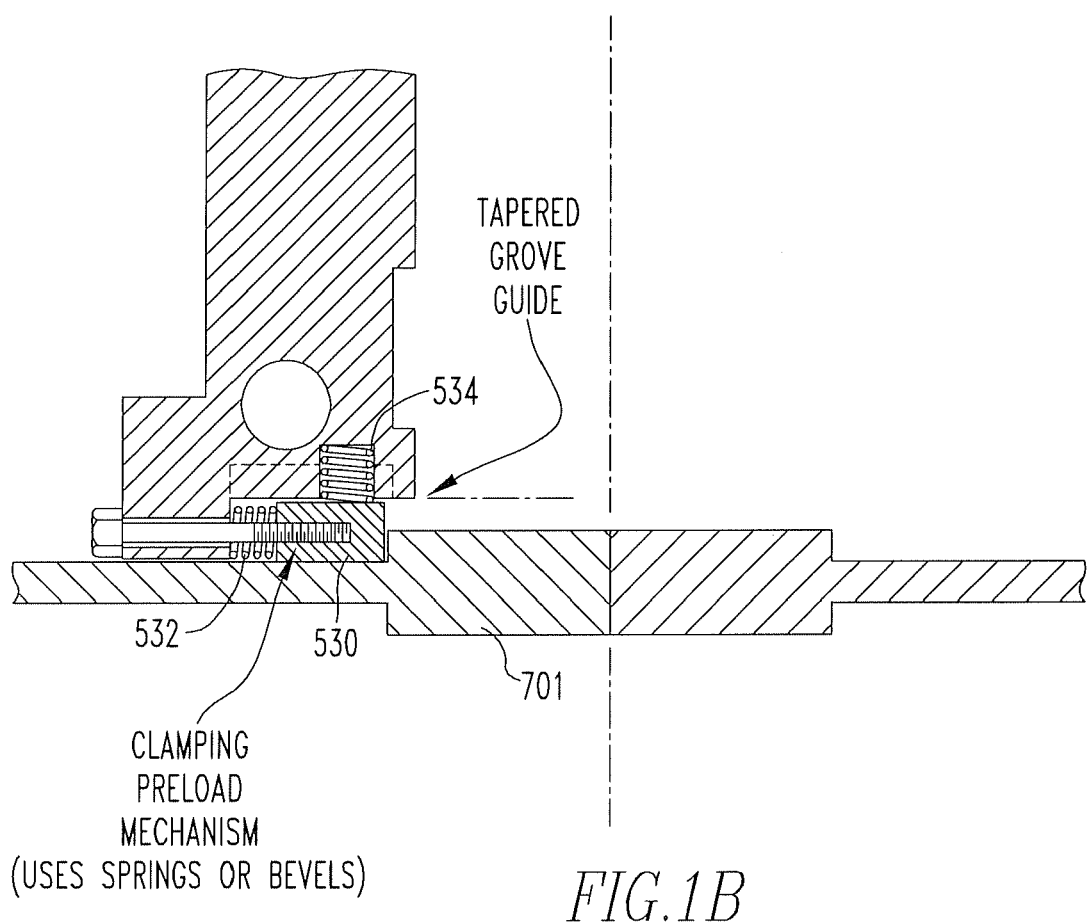
FIG. 1B is a side sectional view of clamping preloading member in one of the members of the crawler.

Referring to FIG. 1B, member 530 which is located in cutout section 500 is positioned to engage rail 701 on the work piece and is urged by spring 532 to move the work piece toward the right to butt against the work piece to which it is to be joined. Also, a second spring 534 is coupled to urge member 530 to move down to contact the work piece. The member 534 can be provided to contact only the top surface of each work piece or a member 534 can be provided for both the top and bottom surfaces of each work piece to both urge the work pieces toward each other to preload the work pieces and to clamp the crawler to the work pieces. In another embodiment, the springs are eliminated and the members are either sized or adjusted to provide a crawler that has a close fit with the work pieces such that the crawler holds the work pieces securely near each other with sufficient force to prevent the tool, during the welding process, from pushing the work pieces apart and prevent the counter torque from rotating the crawler. It is to be noted that the structure disclosed to urge the work pieces together and to clamp the crawler to the work pieces can compensate for work pieces that have uneven edges and/or varying thicknesses.

Thus, by the action of the member 530, the crawler, by being both above and below the work pieces, clamps itself to the work pieces as a weld joint is being made. FIGS. 9-20 show pre-weld and post weld work pieces which can be of a desired material such as aluminum and which have rails or channels at or near their edges to provide guiding and torque compensation for the crawler.

As is here described for the embodiment shown in FIG. 1, it is to be understood that for each embodiment which is disclosed hereinafter, the spacing between adjacent upper and intermediate, and intermediate and lower members of the crawler can be varied to receive work pieces that have different thicknesses. In addition, the members of the crawler have a slot or a rigid projection positioned to slidably engage a rail or a channel on a work piece during the welding process to provide guiding, alignment, fixturing and torque compensation for the crawler in addition to positioning and/or preloading the work pieces by urging the edges of the work pieces toward each other. Also, clamping of the crawler to the work pieces is provided by close fitting or spring loaded members located within the crawler which slidably engage and press against the surfaces of the work pieces during the welding process. Further, for each embodiment disclosed herein, the rail on each work piece can be a raised member or it can be a channel, and the rail can trace a path which is straight, curved or a combination of both. During the welding process, the crawler engages the rails on the work pieces to urge the work pieces to butt against each other to provide a desired preload force to the work pieces during and after the welding process.

Additionally, the work pieces can be of aluminum and the rail member can be formed by extrusion or other type of metal working process. It is here noted that, to avoid having duplicate and repetitive paragraphs in the description, this paragraph is not being repeated for each embodiment hereinafter disclosed, and it is understood that this paragraph of the invention is a part of the description of each embodiment the same as it would be if it were actually included in the description of each embodiment.

The top surface 201T of the front 201A and back 201B sections of the upper member 201 has four threaded openings 300 for receiving four threaded fasteners (not shown) for securing a motor, such as a torque motor 308 (servo, hydraulic, pneumatic or electric), to the upper member 201 when the front 201A and back 201B sections are secured together with threaded fasteners as disclosed above. The front and back surfaces of each member are similar. Therefore, a view of the front surfaces of members 201, 202, 203 of FIG. 1 is not disclosed. The front surface of the front section 201A and the back surface 301 of the back section 201B of the upper member 201 can have four threaded openings (not shown) for receiving four threaded fasteners (not shown) for securing a pull member 210 to the front 201A and back 201B sections of upper member 201. Pull member 210 is provided to receive a pull cable (shown attached to front section 202A) to pull the crawler 200 at a predetermined speed along work pieces being welded.

Intermediate member 202 consists of two substantially similar sections, front section 202A and back section 202B. Back section 202B has four clearance openings 208 for receiving threaded fasteners (not shown) which pass through clearance openings 208 and thread into threaded openings 209 in front section 202A to lock or secure the two sections 202A, 202B together to form member 202. Each section 202A, 202B has a semi-circular shaped cut out 206 for receiving a split sleeve bearing 207 or race with ball bearings. Each member also has a cutout 500 adapted to engage rails or projecting members (not shown) to engage channels on the work pieces. The front and rear surfaces of the intermediate member 202 has four threaded openings (not shown) for receiving threaded fasteners (not shown) for securing pull members 210 to the intermediate member 202. The pull members 210 are provided to receive a pull cable 202P used to pull the crawler 200 at a predetermined speed along work pieces being welded.

Lower member 203 consists of two substantially similar sections, front section 203A and back section 203B. Back section 203B has four clearance openings 211 for receiving threaded fasteners (not shown) which pass through the clearance openings 211 and thread into threaded openings 212 in front section 203A to lock or secure the two sections 203A, 203B together to form member 203. Each section has a semi circular shaped cut out 206 for receiving a split sleeve bearing 207 or a race with ball or roller bearings and cut outs 500 or projecting members (not shown) for engaging rails or channels on the work pieces. The front surface (not shown) and rear surface of the lower member 203 can have four threaded openings (not shown) for receiving threaded fasteners (not shown) for securing pull members 210 to the lower member The pull members 210 are provided to receive a pull cable similar to pull cable 201P to pull the crawler 200 at a predetermined speed along work pieces being welded.

Continuing with FIG. 1, prior to joining the front 201A, 202A, 203A and back 201B, 202B, 203B sections of the upper 201, intermediate 202 and lower 203 members together, and subsequent to inserting the split sleeve bearings 207 into respective cutouts 206 in the upper 201, intermediate 202 and lower 203 members, a replaceable Friction Stir Welding (FSW) tool 213 is fitted in place in the three members. As described in detail below, the FSW tool 213 disclosed herein can be configured to make a single weld or two welds simultaneously. However, an embodiment with more than two members is contemplated to be within the scope of the invention as discussed herein. The tool 213 can be a single member (as shown) without any removable sections, or it can be made of two or more separate sections (not shown) that can be coupled together with, for example, a threaded pin which engages a threaded opening to form a continuous tool. When the tool is made of two or more sections, the threads on the threaded pin of one section are designed to thread into a threaded opening in the other section as the tool is being rotated.

One embodiment of the present invention is shown for use with a FSW tool having three bearing surfaces adapted to rotatably engage the three split sleeve bearings 207 in the front and back sections of the three members 201, 202, 203. When the FSW tool 213 is located in the upper 201, intermediate 202, and lower members 203, an upper FSW bobbin 216 is aligned with the space 201X between the upper 201 and intermediate 202 members; and a lower FSW bobbin 217 is aligned with the space 201Y between the intermediate 202 and lower 203 members. The spaces 201Y, 201X, as explained below, are determined by the relationship of various dimensions relative to each other such as the spacing between the bearings on the FSW tool, the spacing between the semi circular shaped cut outs 206 in the member 201, 202, 203, and the spacing between the semi circular cut outs 206 in each member and the physical end of each member at the space. However, in practice, where the members of the crawler are available for use, it is the tool which determines the spacing between the members. Thus, different tools can be used to provide the proper spacing between crawler members to allow the crawler to be used with work pieces of different thicknesses.

After the front and back sections of the three members 201, 202, 203 are joined together around the replaceable FSW tool to entrain or encapsulate the FSW tool 213 within crawler 200, the torque motor 308 is placed on the top surface 201T of the upper member 201 to engage a splined engagement pin 214 located at the end of the FSW tool 213, which projects above the top surface 201T of the upper member 201. The torque motor 308 is then attached to threaded openings 300 in the upper member 201 with threaded fasteners (not shown). At this time, the friction stir welding tool is ready to join at least two work pieces together.

In operation, where two welds are to be made simultaneously, see FIG. 1A, a first pair of work pieces 400 that are to be joined are positioned edge to edge in the space 201Y between the front sections of the lower 203 and intermediate 202 members respectively. A second pair of work pieces 402 that are to be joined are positioned edge to edge in the space 201X between the front sections of the intermediate 202 and upper 201 members respectively. Prior to starting the welding process, replaceable FSW tool 213 was inserted into the split sleeve bearings 207 located in the front sections 201A, 202A, 203A, and the back sections 201B, 202B, 203B of the three members 201, 202, 203 were attached to the front members 201A, 202A, 203A. Immediately prior to making the weld, the lower bobbin 217 of the FSW tool 213 is located at the weld seam (defined by the interface/contact of the two work pieces) of the first pair of work pieces 400, and the upper bobbin 216 of the FSW tool 213 is located at the weld seam of the second pair of work pieces 402, and generally along the center line (CL). A pull cable (not shown) is attached to pull member (not shown) on, for example, the intermediate member 202 and is used to pull the crawler 200 along the rail 425 on the work pieces 400, 402 within cutouts 500 having side walls 501 that slidably engage rails 425 as the FSW tool is rotating and traversing along the weld seam.

An alternate embodiment not shown includes work pieces having channels and slidably engaging projections formed within or in place of cutouts 500. It is here noted that the rails on the work pieces provide guiding, alignment and torque compensation for the crawler 200. In another embodiment, pull cables (not shown) can be attached to each of the three members 201, 202, 203 to advance the crawler along the work pieces.

Now referring to FIG. 2 there is shown a side sectional view of another embodiment of the present invention having a crawler 200A with two separate members 201, 203 coupled to a FSW tool 213A. The embodiment shown in FIG. 2 is similar to the embodiment of FIG. 1, except the embodiment of FIG. 2 does not include an intermediate member 202 as shown in FIG. 1. The various parts of FIG. 2 which are similar to those parts of FIG. 1 have been given the same reference numerals and some of the parts of FIG. 1 may not be shown in FIG. 2. Upper member 201 and lower member 203 can be composed of a semi-flexible material such as a yieldable plastic or a rigid material such as cast Iron or other similar material and each member is composed of two substantially similar half sections to provide a front section 201A, 203A and a back section 201B, 203B: Back section 201B has four clearance openings for receiving threaded fasteners which pass through the clearance openings and thread into threaded openings in front section 201 A to join the two sections together as described above for the embodiment of FIG. 1. Each section has a semi circular shaped cut out 206 for receiving a split sleeve bearing 207 or race with ball bearings and cutouts 219 for engaging rails on the work pieces. The top surface of the front and back sections of the upper member 201 has four threaded openings (not shown) for receiving threaded fasteners (not shown) for securing a motor, such as a torque motor 308 to the upper member 201 when the front and back sections are secured together. The front surface and rear surface of the upper member 201 can have four threaded openings (not shown) for receiving threaded fasteners (not shown) which secure pull members 210 to the upper member 201. The pull members are provided to receive a pull cable 201P to pull the crawler 200 at a predetermined speed along work pieces being welded.

Lower member 203 consists of two substantially similar sections, front section 203A and back section 203B. Back section 203B has four clearance openings (not shown) for receiving threaded fasteners (not shown) which pass through the clearance openings and thread into threaded openings (not shown) in front section 203A to join the two sections together. Each section has a semi circular shaped cut out 206 for receiving a split sleeve bearing 207 or a race with ball bearings and cutouts for engaging rails or channels on the work pieces. The front and back sections of the lower member have four threaded openings (not shown) for receiving threaded fasteners (not shown) for securing pull members 210. The pull members are provided to receive a pull cable 201P used to pull the crawler at a predetermined speed along work pieces being welded.

Prior to joining the front and back sections of the upper 201 and lower 203 members together, and subsequent to inserting the split sleeve bearings 207 into respective cutouts 206 in the upper 201 and lower 203 members, a Friction Stir Welding (FSW) tool 213 is first fitted in place in either the front or back section. The front and back sections of the two members 201, 203 are then secured together to envelop or entrap the FSW tool 213. At this time a gap 201X is formed between members 201, 203 which is slightly larger than the thickness of the work pieces 402. Thus, when the dimensions of the crawler are fixed to receive and operate with various tool, the spacing 201X between the members 201, 203, is determined by the spacing between the bearings on the tool.

The FSW tool 213A in this embodiment is configured to make one weld. The tool 213 can be a single member without any removable sections, or it can be made of two or more separate sections which can be coupled together with at least one threaded pin which engages a threaded opening in another section to form a continuous tool. When the tool is made of two or more sections, the threads on the threaded pin of one section are designed to thread into the threaded opening in the other section as the tool is being rotated.

The FSW tool 213A shown in the embodiment of FIG. 2 has two separate bearing surfaces 206A adapted to rotatably engage two split sleeve bearings 207 or races with ball or roller bearings in the front 201A, 203A and back 201B, 203B sections of the two members 201, 203. When the FSW tool 213A is located in the upper and lower members, a single FSW bobbin 218 is aligned with the space 201X between the upper 201 and lower 203 members as described above.

In operation, when a weld is to be made, a pair of work pieces 402, which can have rails 701 as shown in FIG. 9 which are to be joined are positioned edge to edge between the front sections of the upper 201 and lower 203 members. At this time the FSW bobbin 218 of the tool 213 is located at the beginning of the weld joint of the work pieces and a pull cable 201P is attached to the upper member and is used to pull the crawler 200 along the rails 701 on the work pieces 700 as the FSW tool is rotating. In another embodiment, a pull cable 202P can be attached to each of the two members 201, 203, instead of to only one member to advance the crawler along the work pieces. In another embodiment, a threaded shaft connected to the crawler can be used to advance the crawler along the work pieces as a weld is being made. In each embodiment, sensors can be provided to control the speed of advance of the crawler and other parameters which may be required as a weld is being made.

FIG. 3 is a front partial sectional view of the embodiment of FIG. 2. As noted above, in the various embodiments, the space 201X for the work pieces which is located between adjacent members 201, 203 is determined by design of the tool when the crawler is made with dimensions which have been standardized.

FIG. 4, is a side partial sectional view of a friction stir welding crawler 200B having one member 201 coupled to a friction stir welding tool 213B. See the description above of FIG. 1 for a detailed description of the various features of FIG. 4 which are common with those of FIG. 1. The member 201 can be composed of a semi-flexible material such as a plastic or a rigid material such as cast iron or other equivalent material and is split to provide two substantially similar sections, a front section 201A and a back section 201B. Back section 201B has four clearance openings (not shown) for receiving threaded fasteners (not shown) which pass through the clearance openings and thread into threaded openings (not shown) in front section 201 A to join the two sections together. Each section has a semi circular shaped cut out 206 for receiving a race with ball bearings or a split sleeve bearing 207 and having cutouts 219 for engaging rails or projections (not shown) for engaging channels on work pieces that are to be joined by welding. The top surface of the front and back sections of the member 201 has four threaded openings (not shown) for receiving threaded fasteners (not shown) for securing a motor, such as a torque motor 308 to the member 201 when the front and back sections are joined together. The front surface and rear surface of member 201 can have four threaded openings for receiving threaded fasteners for securing pull members 210 to the crawler. The pull members are provided to receive a pull cable 201P used to pull the crawler 200B along the rails 701 on the work pieces at a predetermined speed during the welding process.

Prior to attaching the front 201A and back 201B sections of the member 201 together, and subsequent to inserting the split sleeve bearings 207 into respective cutouts 206 in the member, a Friction Stir Welding (FSW) tool 213B is fitted in place in the split sleeves in the front section or back section and the two sections are then joined together to form the member 200A. The FSW tool 213B is configured to make one weld. The tool 213 can be a single member without any removable sections.

Continuing with FIG. 4, the FSW tool 213B has a single bearing surface 206A adapted to rotatably engage a split sleeve bearing 207 or a race having ball bearings (not shown) in the front 201A and back 201B sections of member 201. After the front and back sections of the member are joined together and encapsulate the replaceable FSW tool 213B, a torque motor 308 is placed on the top surface 201T of member 201 to engage a splined engagement pin 214 located at the end of the FSW tool 213B, which projects above the top surface 201T of member 201. The torque motor 308 is then attached to the member 201 with threaded fasteners as described above.

In operation, when a weld is to be made, the bobbin 218 of the tool 213B is located at the edge of two work pieces and in line with a weld joint that is to be made. A pull cable 201P or other drive structure such as a screw drive (not shown) is coupled to the member 201 and is used to advance the crawler 200B along the rails or channels on the work pieces 402 as the FSW tool 213B is rotated and traverses along the weld seam.

Figure 5:
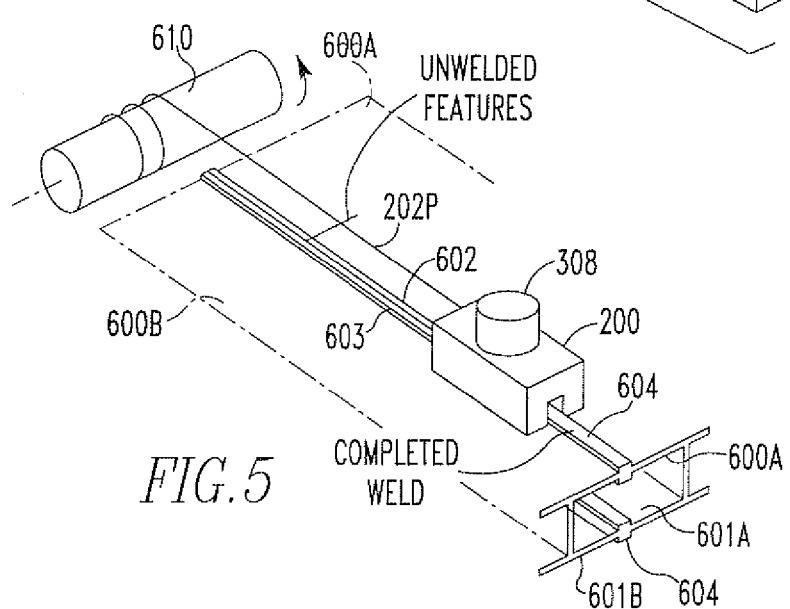
FIG. 5 is a perspective view of a friction stir welding tool coupled to a guide on a work piece to prevent rotation of the housing.

FIG. 5 is a perspective view of a friction stir welding tool coupled to rails on work pieces where the members 530 located in the crawler 200, in combination with the rails, urge the edges of the work pieces 600A, 600B and 601A, 601B) (as described above) toward each other to provide preloading of the work piece pairs and also provide guiding, alignment and torque compensation for the crawler. More specifically, in one embodiment, work pieces 600, 601 can be of aluminum with enlarged edges 602, 603 butted together with a predefined force by the crawler 200 as explained above. As the crawler is advanced by a driven take up reel 610, or any other drive structure such as a screw drive (not shown) toward the left, the rotating FSW tool in the crawler 200 forms a weld joint 604. It is to be noted that, as mentioned above, the members 201, 202, 203 of the crawler 200 are positioned both above and below the work pieces 600, 601 and, as noted previously, the crawler is slidably clamped to work pieces 600A, 600B, 601A, 601B. Additionally, the crawler 200, by urging the work pieces 600A, 600B and 601A, 601B toward each other, preloads the work pieces. The rails on the work pieces function as guides for the crawler 200 and also provides guiding, alignment and torque compensation for the crawler 200.

Figure 6:
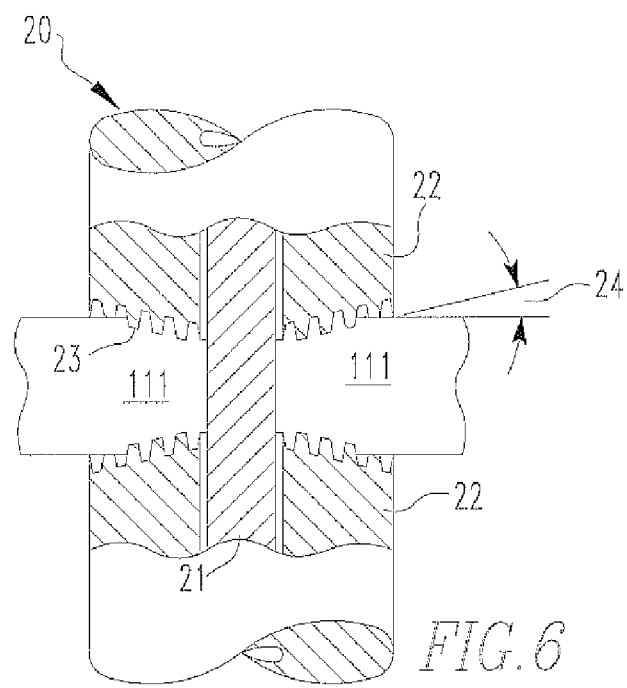
FIGS. 6-8 show various friction stir welding tools which can be used to make welds.

In those instances where it is not possible to place a back up anvil on the back side of a weld being made, a bobbin-type tool may be used. Such tools include two shoulders and a pin located between them. The bobbin-type FSW tool 20 shown in FIG. 6 includes a pin 21 located between a pair of shoulders 22 which include work piece engaging surfaces 23. The shoulders 22 can have a taper angle 24 and can be integral with pin 21. To insure that the tool contacts and frictionally engages work pieces 111, which may vary slightly in thickness, the work piece engaging surfaces 23 of the tool are tapered at an angle 24 shown in FIG. 6.

The taper angle 24 enable work pieces having slightly different and/or somewhat variable thicknesses to be welded together and also ensures that the FSW tool is pressed against the work pieces with the force needed to both plasticize and confine the plasticized material in the weld area to produce smooth surfaces on the upper and lower surfaces of the weld.

Figure 7:
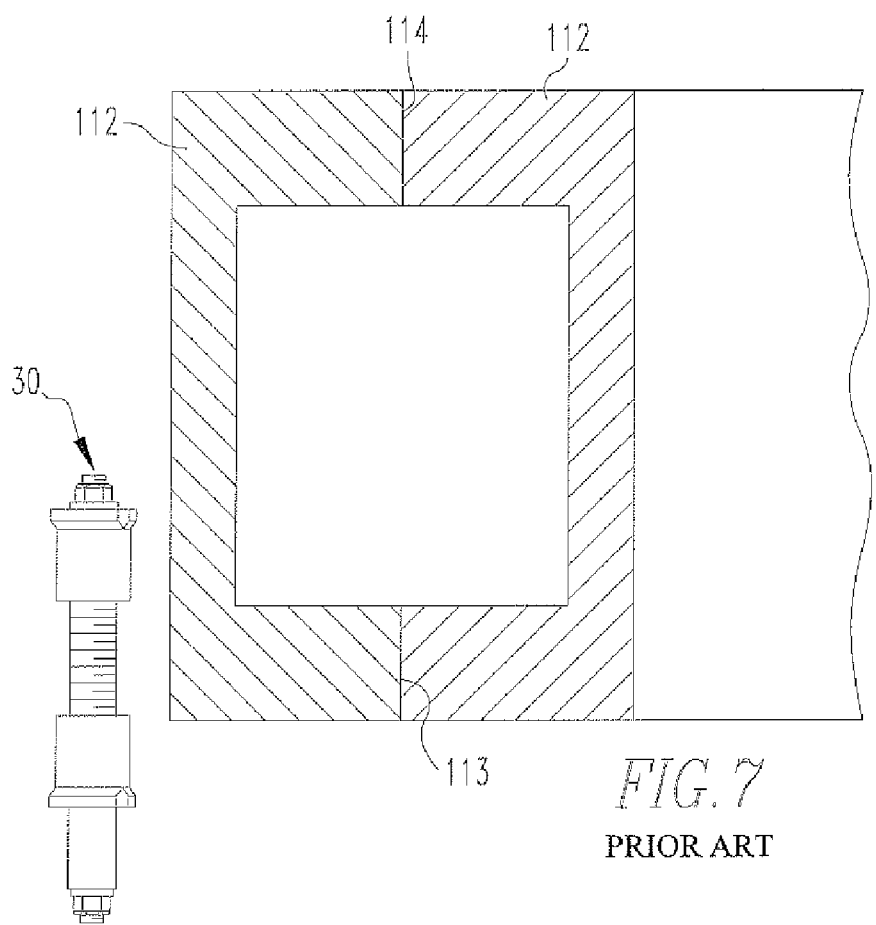

FIG. 7 illustrates bobbin type tool 30 which can be used with the crawler here disclosed to weld one joint 113 of a pair of joints 113 and 114 to produce a tube from a pair of elongate members. The tube shown in FIG. 7 has a substantially square cross section, it being understood that the tube can have a cross section which is rectangular, circular, oval etc. In FIG. 7, each elongate member 112 has a square C cross-sectional shape, and each elongate member corresponds to one half of the cross-section of the rectangular tube. It is here noted that the tool 30 is capable of welding only one joint at a time.

Figure 8:
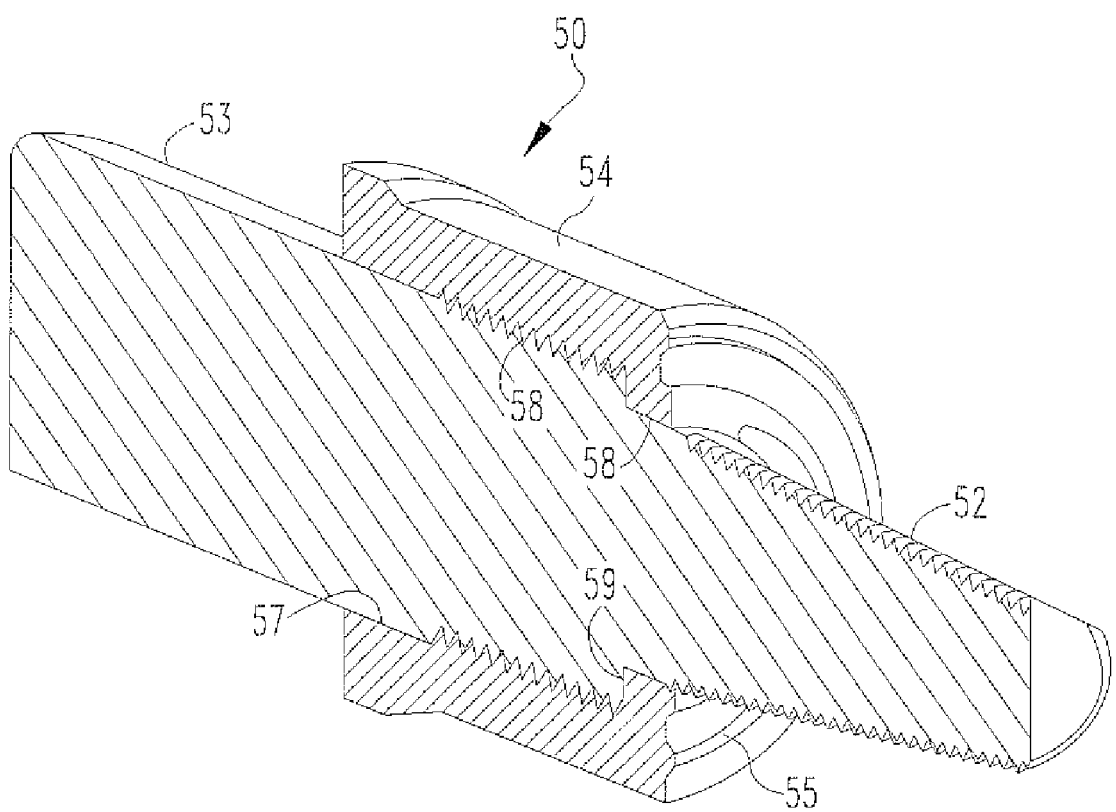

FIG. 8 shows a sectional view of a pin type tool 50 having an integral shank-pin with a shoulder 54 threaded onto the shank-pin to provide compression loading of the pin of a pin type tool. The tool 50 has a close fit 57 between the shank and the inside of shoulder 54 near the base of pin 52, and has a positive stop 59 between the inside of shoulder 54 and the shank 53. It is contemplated that this tool can be used with the crawler here disclosed which has only one member such as 201 which is located on the top surface of two work pieces and is pulled along the weld seam as the tool is rotating.

The tools referred to above can be used with a crawler here disclosed to make welds on many different types of structures, one such structure being parts for automobiles.

FIGS. 9-20 show various work piece configurations and types of welds that can be made with the FSW crawler here disclosed.

Referring to FIG. 9, there is shown work pieces 700, prior to being welded, which were extruded to have rails 701 at their edges. The rails 701 are substantially rectangular in shape and are partially consumed during the welding process. Note that the outboard edges 703 of the rails are intact after the weld is completed. FIG. 10 shows the plates after they have been welded together with the outboard edges 703 of the rails 701 still intact. FIG. 12 shows another type of weld that can be formed with work pieces of FIG. 11 having extruded rails 705 which are shorter in length. In the embodiment of FIG. 11, the rectangular rails 705 of the work pieces which are shorter in length than the rails 701 are almost fully consumed during the welding process. In FIG. 12, it can be seen that only the outboard ends 706 of the guide rails are not consumed during the welding process. FIG. 14 shows still another type of weld that can be formed with the work piece of FIG. 13 having extruded ends. The rails 708 of FIG. 13 are similar to the rails of FIG. 11 except the inboard ends 709 of the rails are undercut.

FIG. 16 shows another type of weld that can be formed with the work pieces 710 of FIG. 15 having channels 712 located near their ends. Note, in FIG. 16 the channels are completely consumed during the welding process. FIG. 18 shows another type of weld that can be formed with work pieces 713 of FIG. 17 having ends 715 entrapped with a snap guide 716 adapted to function as a guide rail for engagement by the crawler. The snap guide 716 and ends 715 are consumed during the welding process. FIG. 20 shows another type of weld that can be formed with the work pieces 718 of FIG. 19 having channels 719 located inboard from their ends 720. With this embodiment, the channels 719 remain intact after the welding process.

While there has been described herein the principles of the invention, it is to be clearly understood to those skilled in the art that this description is made only by way of example and not as a limitation to the scope of the invention. Accordingly, it is intended to cover all modifications of the invention which fall within the true spirit and scope of the invention.

What is claimed is:

1. A friction stir welding apparatus comprising:
   a first member having at least one bearing surface for rotatably receiving a friction stir welding tool;
   a second member having at least one bearing surface for rotatably receiving the friction stir welding tool;
   the friction stir welding tool having a first bearing surface rotatably coupled to the at least one bearing surface in the first member, before the tool is inserted into at least one of two work pieces, and a second bearing surface rotatably coupled to the at least one bearing surface in the second member, before the tool is inserted into the at least one of two work pieces; and
   an engagement member coupled to at least one of the first member and the second member, wherein the engagement member is adapted to apply an engaging force in a direction perpendicular to the longitudinal axis of the friction stir welding tool to engage the at least one of two work pieces to provide torque compensation for the friction stir welding apparatus while the friction stir welding tool is rotating.

2. The friction stir welding apparatus of claim 1 wherein the engagement member is adapted to provide guiding for the friction stir welding apparatus while the friction stir welding tool is rotating.

3. The friction stir welding apparatus of claim 1 wherein the engagement member is adapted to provide alignment for the friction stir welding apparatus while the friction stir welding tool is rotating.

4. The friction stir welding apparatus of claim 1 wherein the engagement member is adapted to provide fixturing for the friction stir welding apparatus while the friction stir welding tool is rotating.

5. A friction stir welding apparatus comprising:
a first member adapted to receive a friction stir welding tool;
a second member spaced from the first member adapted to receive the friction stir welding tool;
wherein the friction stir welding tool is coupled to the first member and the second member, before the tool is inserted into at least one work piece;
a first engagement member coupled to the first member, wherein the first engagement member is adapted to engage a top surface of the at least one work piece;
a second engagement member coupled to the second member, wherein the second engagement member is adapted to engage a bottom surface of the at least one work piece; and
wherein the first engagement member and the second engagement member are adapted to apply engaging forces in a direction perpendicular to the longitudinal axis of the friction stir welding tool to the top and bottom surfaces of the at least one work piece to provide torque compensation for the friction stir welding apparatus while the friction stir welding tool is rotating.

6. The friction stir welding apparatus of claim 5 wherein the first member and the second member are spaced apart by a distance sufficient to receive the at least one work piece, and wherein the first engagement member and the second engagement member are adapted to provide at least one of guiding, alignment, and fixturing for the friction stir welding apparatus while the friction stir welding tool is rotating.

7. The friction stir welding apparatus of claim 5 further comprising:
a drive structure coupled to at least one of the first member and the second member, wherein the drive structure is adapted to urge along the at least one work piece as the friction stir welding tool is rotated to form a joint.

8. The friction stir welding apparatus of claim 5 wherein the first engagement member coupled to the first member is adapted to engage a first rail on the top surface of the at least one work piece, and wherein the second engagement member coupled to the second member is adapted to engage a second rail on the bottom surface of the at least one work piece.

9. The friction stir welding apparatus of claim 8 wherein each of the first rail and the second rail on the at least one work piece is a raised member.

10. The friction stir welding apparatus of claim 8 wherein each of the first rail and the second rail on the at least one work piece is a channel member.

11. The friction stir welding apparatus of claim 8 wherein each of the first rail and the second rail on the at least one work piece traces a path that is straight, curved, or a combination of both.

12. A friction stir welding apparatus comprising:
a first member adapted to receive an upper section of a friction stir welding tool;
a second member spaced below the first member adapted to receive a middle section of the friction stir welding tool;
a third member spaced below the second member adapted to receive a lower section of the friction stir welding tool;
the friction stir welding tool coupled to the first member, the second member, and the third member;
an upper engagement member coupled to the first member, wherein the upper engagement member is adapted to engage a top surface of an upper work piece;
a middle engagement member coupled to the second member, wherein the middle engagement member is adapted to engage a bottom surface of the upper work piece and an upper surface of a lower work piece; and
a lower engagement member coupled to the third member, wherein the lower engagement member is adapted to engage a bottom surface of the lower work piece;
wherein the upper engagement member, the middle engagement member, and the lower engagement member are adapted to apply engaging forces in a direction perpendicular to the longitudinal axis of the friction stir welding tool to the top and bottom surfaces of the upper and lower work pieces to provide torque compensation for the friction stir welding apparatus while the friction stir welding tool is rotating.

13. The friction stir welding apparatus of claim 12 wherein each of the upper engagement member, the middle engagement member, and the lower engagement member is adapted to engage a rail on at least one of the upper work piece and the lower work piece.

14. The friction stir welding apparatus of claim 13 wherein the rail on each of the upper work piece and the lower work piece is a raised member.

15. The friction stir welding apparatus of claim 13 wherein the rail on each of the upper work piece and the lower work piece is a channel member.

16. The friction stir welding apparatus of claim 13 wherein the rail on each of the upper work piece and the lower work piece traces a path that is straight, curved or a combination of both.

17. The friction stir welding apparatus of claim 12 further comprising a drive structure coupled to at least one of the first member, the second member, and the third member, wherein the drive structure is adapted to urge along at least one of the upper work piece and the lower work piece as the friction stir welding tool is rotated to form a joint.

18. The friction stir welding apparatus of claim 12 wherein at least one of the upper engagement member, the middle engagement member, and the lower engagement member is spring loaded to urge at least one edge of at least one of the upper work piece and the lower work piece toward each other.

19. The friction stir welding apparatus of claim 1 wherein the first member and the second member each comprises two half sections which, when separated, allow the friction stir welding tool to be placed therein.

20. The friction stir welding apparatus of claim 1 wherein the friction stir welding tool is monolithic.

21. The friction stir welding apparatus of claim 5 wherein the friction stir welding tool is monolithic.

22. The friction stir welding apparatus of claim 12 wherein the friction stir welding tool is monolithic.

* * * * *